(12) United States Patent
Grojean (10) Patent No.: US 11,959,505 B2
(45) Date of Patent: Apr. 16, 2024

(54) FASTENING COMPONENT AND METHOD FOR MANUFACTURING A COMPOSITE PART WITH THIS COMPONENT

(71) Applicant: Maxime Grojean, Commercy (FR)

(72) Inventor: Maxime Grojean, Commercy (FR)

( * ) Notice: Subject to any disclaimer, the term of this patent is extended or adjusted under 35 U.S.C. 154(b) by 0 days.

(21) Appl. No.: 16/091,730

(22) PCT Filed: Apr. 6, 2017

(86) PCT No.: PCT/FR2017/050827
§ 371 (c)(1),
(2) Date: Oct. 5, 2018

(87) PCT Pub. No.: WO2017/174943
PCT Pub. Date: Oct. 12, 2017

(65) Prior Publication Data
US 2019/0128312 A1    May 2, 2019

(30) Foreign Application Priority Data
Apr. 7, 2016  (FR) ..................... 16/53070

(51) Int. Cl.
*F16B 37/06* (2006.01)
*B29C 65/00* (2006.01)
(Continued)

(52) U.S. Cl.
CPC ............ *F16B 37/062* (2013.01); *B29C 65/64* (2013.01); *B29C 65/645* (2013.01);
(Continued)

(58) Field of Classification Search
CPC .... F16B 19/086; F16B 37/068; F16B 37/062; F16B 5/04; F16B 21/088; F16B 37/048;
(Continued)

(56) References Cited

U.S. PATENT DOCUMENTS 1,394,608 A * 10/1921 Davern ................. F16B 35/044
411/390
3,057,285 A * 10/1962 Wheeler ............... E04B 1/7076
52/302.1
(Continued)

FOREIGN PATENT DOCUMENTS

CA        2080065 A1 *  4/1994  ........... F16B 13/002
DE    102012204187 A1    7/2013
(Continued)

OTHER PUBLICATIONS

NPL: AVS General Purpose Tools, Aviation Online Magazine, General Purpose Tools, 2012, p. 3, <http://avstop.com/ac/apgeneral/generalpurposetools.html> (Year: 2012).*

(Continued)

*Primary Examiner* — Flemming Saether
(74) *Attorney, Agent, or Firm* — CANTOR COLBURN LLP (57) ABSTRACT

An attachment component which includes a body, the body having attachment means intended for allowing the attachment component to be assembled with a part including complementary attachment means, an insertion tip arranged at one end of the body so as to allow at least one portion of the body to be inserted through a part made of composite material, an axial abutment intended for halting the insertion of the body through the part made of composite material, and a breakable portion inserted between the insertion tip and said end of the body, the breakable portion being configured to break when a predetermined force is applied to the insertion tip with a view to detaching the insertion tip from the body.

16 Claims, 4 Drawing Sheets

(51) Int. Cl.
*B29C 65/64* (2006.01)
*B29C 65/74* (2006.01)
*F16B 5/04* (2006.01)
*F16B 19/08* (2006.01)
B29L 31/00 (2006.01)
F16B 31/02 (2006.01)

(52) U.S. Cl.
CPC ........ *B29C 65/7437* (2013.01); *B29C 66/131* (2013.01); *B29C 66/474* (2013.01); *B29C 66/532* (2013.01); *B29C 66/721* (2013.01); *B29C 66/72141* (2013.01); *B29C 66/742* (2013.01); *B29C 66/7422* (2013.01); *B29C 66/74283* (2013.01); *B29C 66/8322* (2013.01); *F16B 5/04* (2013.01); *F16B 19/086* (2013.01); *F16B 37/068* (2013.01); B29C 66/7428 (2013.01); B29C 2793/0045 (2013.01); B29L 2031/737 (2013.01); F16B 31/021 (2013.01)

(58) Field of Classification Search
CPC .... F16B 35/044; F16B 13/002; F16B 13/003; F16B 19/0086; F16B 19/1081; F16B 21/06; B29C 65/7437; B29C 66/72141; B29C 66/645; B29C 66/131; B29C 66/7422; B29C 66/74283; B29C 66/8322; B26F 1/24
USPC ............... 411/42, 39, 2, 3, 5, 493, 498, 179; 24/621, 703.1, 703.2
See application file for complete search history.

(56) References Cited

U.S. PATENT DOCUMENTS

| | | | | |
|---|---|---|---|---|
| 3,107,572 A * | 10/1963 | Orloff | ................. | F16B 19/1063 411/34 |
| 3,238,835 A * | 3/1966 | Rosenberg | ................ | B63B 3/68 411/338 |
| 3,487,745 A * | 1/1970 | Brunelle | ............. | F16B 19/1081 411/29 |
| 4,747,199 A * | 5/1988 | Kitchen | ................ | B29C 65/609 29/418 |
| 4,761,871 A * | 8/1988 | O'Connor | ............. | B29C 65/562 29/432.1 |
| 5,199,149 A * | 4/1993 | Matsuura | .............. | F16B 19/086 29/432 |
| 5,447,400 A * | 9/1995 | Seymour | ............... | F16B 13/002 52/220.8 |
| 5,499,896 A * | 3/1996 | Cafarelli | ............ | F16B 25/0084 408/224 |
| 5,551,817 A * | 9/1996 | Kanie | ................... | F16B 21/088 411/107 |
| 5,746,096 A * | 5/1998 | Lukes | ................. | F16B 25/0084 81/180.1 |
| 5,788,444 A * | 8/1998 | Losada | ................... | F16B 19/14 411/441 |
| 5,915,901 A * | 6/1999 | Aasgaard | ................ | B29C 66/43 411/29 |
| 6,511,274 B1 * | 1/2003 | Nagayama | ............ | F16B 37/065 411/181 |
| 7,261,026 B2 * | 8/2007 | Welch | ....................... | B26F 1/24 83/660 |
| 8,137,042 B2 * | 3/2012 | Severns | ............. | F16B 25/0063 411/387.1 |
| 2008/0008554 A1 * | 1/2008 | Lu | ......................... | F16B 13/003 411/29 |
| 2013/0340239 A1 * | 12/2013 | Ueda | ................. | B29C 66/81423 29/525.06 |
| 2014/0348615 A1 | 11/2014 | Flock | | |
| 2015/0056042 A1 * | 2/2015 | Marxkors | ................. | F16B 5/04 411/501 |
| 2015/0167723 A1 * | 6/2015 | Flock | ................. | B29C 65/7457 29/525.05 |
| 2017/0130471 A1 * | 5/2017 | Huang | .................... | E04G 11/10 |
| 2020/0096033 A1 * | 3/2020 | Dill | ..................... | F16B 23/0007 |
| 2021/0262511 A1 * | 8/2021 | Grojean | ............. | F16B 25/0078 |

FOREIGN PATENT DOCUMENTS

| | | | | |
|---|---|---|---|---|
| EP | 0392568 A1 | 10/1990 | | |
| FR | 2900451 A1 * | 11/2007 | ........... | F16B 13/002 |
| FR | 2900451 A1 | 11/2007 | | |

OTHER PUBLICATIONS

Written Opinion for Application No. PCT/FR2017/050827.
English Machine Translation of Abstract FR2900451 (A1).
International Search Report for Application No. PCT/FR2017/050827.
Communication pursuant to Article 94(3) EPC dated Jun. 4, 2021; EP Application No. 17720197.7; 5 pages (non- English).
Opinion dated Nov. 30, 2016; FR Application No. 1653070; 4 pages (non-English).
Search Report dated Nov. 23, 2016; FR Application No. 1653070; 2 pages.

* cited by examiner

FASTENING COMPONENT AND METHOD FOR MANUFACTURING A COMPOSITE PART WITH THIS COMPONENT

CROSS REFERENCE TO RELATED APPLICATIONS

This application is a National Stage of PCT Application No. PCT/FR2017/050827 filed on Apr. 6, 2017 which claims priority to French Patent Application No. 16/53070 filed on Apr. 7, 2016 the contents each of which are incorporated herein by reference thereto.

TECHNICAL FIELD

The present invention concerns a fastening component and a method for manufacturing a composite material part by means of this fastening component.

BACKGROUND

The current context of reduction of energy consumption promotes the development of composite material parts, for their lightweight and mechanical strength properties. Aircrafts or vehicles tend to integrate more and more composite material parts, in particular structural parts. Yet, structural parts necessitate the ability to attach and fasten components or accessories thereto, as well as the ability to easily dismount these components or accessories for the replacement thereof.

However, it is currently difficult to fasten composite material parts to each other and to attach accessories made of other materials thereto.

A first reason for this difficulty is the complexity of this operation and its integration cost. Indeed, there is a considerable number of steps to integrate a fastening component into a composite matrix: making of a hole, bonding, various preparations before integration, etc. All these steps are time-consuming and have an impact on the rise of the manufacturing costs of the composite parts including fastening elements.

A second reason is the optimization of the mechanical performances of the composite part. Indeed, the making of holes results in cutting of the fibers of the composite matrix, which weakens the composite part at the level of the fastening points. Yet, the fastening points are generally subjected to considerable loads.

BRIEF SUMMARY

Also, the present invention aims at overcoming all or part of these drawbacks by providing a fastening component enabling easy fastening or dismount of composite material parts, with a zero or minimum impact on the mechanical performances intrinsic to this type of parts, as well as a method for manufacturing a composite material part offering the possibility of being easily fastened or separated with other components.

To this end, an object of the invention is a fastening component comprising a body, the body comprising a fastening member intended to enable the assembly of the fastening component to a part integrating complementary fastening member, an insertion tip arranged at one end of the body so as to allow inserting at least one portion of the body through a composite material part, an axial stop intended to stop the insertion of the body through the composite material part, and a frangible portion interposed between the insertion tip and said end of the body, the frangible portion being configured to break up by the action of a predetermined force exerted on the insertion tip in order to detach the insertion tip from the body.

Thus, the fastening component according to the invention provides a simple, robust, rapid and effective solution to enable fastening or dismounting accessories on a composite material part. The insertion tip allows moving away progressively the fibers of the composite material, without sectioning them, in order to preserve the mechanical strength of the composite material part. Thanks to the frangible portion, the insertion tip may be detached afterwards from the rest of the fastening component to clear access to the fastening member and thus enable fastening of a complementary component.

According to a preferred embodiment, the insertion tip comprises a base portion and an end portion, the end portion having an apex angle smaller than an apex angle of the base portion.

These features allow inserting the fastening component effectively through the fibers of a composite part without altering the mechanical resistance provided by the composite part. Instead of being cut, the fibers are diverted and constricted around the insertion tip and then around the body of the fastening component, which locally reinforces the mechanical strength around the fastening component.

According to a preferred embodiment, the insertion tip is cone shaped.

This allows avoiding the damage of the fibers of the composite part and evenly distributing the force on the frangible portion during the introduction of the insertion tip, in order not to cause an early breakage of this frangible portion. Hence, reliability is improved.

According to a preferred embodiment, the body comprises a compaction portion arranged between the frangible portion and the fastening member.

This compaction portion is intended to be compacted after breakage of the frangible portion, as a protection of the fastening member, so that the fastening member itself is not deformed. Hence, this allows protecting, by preferred deformation, the fastening active area.

According to one possibility, the insertion tip has a base with a width equal to or larger than that of the body.

This allows rearranging the fibers of the composite material part around the body, in order to locally consolidate the mechanical strength of the composite part. This also avoids that the fibers of the composite part get stuck in the external thread when the fastening component is of the male type including an external thread.

Advantageously, the frangible portion is a matter bridge between the body and the insertion tip. Hence, it consists of a portion with a smaller thickness in comparison with the body and the insertion tip.

According to a preferred embodiment, the body delimits a conduit and the insertion tip has a bearing surface extending around the conduit, the bearing surface being intended to bear, after breakage of the frangible portion, against a receiving face of the end of the body extending around the conduit.

Advantageously, this allows closing access to the central conduit in order to avoid the introduction of plastic matter inside the central conduit during a subsequent injection step. Hence, this geometry serves to ensure sealing and to protect the fastening active area.

According to a preferred embodiment, the axial stop comprises an attached subplate.

The subplate allows extending the bearing area of the fastening component on the composite material part, in order to distribute the forces and improve the mechanical strength of the fastening component assembled to the composite material part.

Furthermore, the fact that the subplate is attached offers the possibility of adapting, by the selection of the size and/or the shape of the subplate, the magnitude and the distribution of bearing on the composite material part.

According to a preferred embodiment, the frangible portion has a thickness which decreases in the direction of the body.

Thus, the breakage takes place the closest to the body.

According to a preferred embodiment, the fastening component is made of aluminum.

Thus, the fastening component provides an advantageous solution in terms of weight/mechanical performances. In addition, aluminum allows avoiding the problems of corrosion at the level of the frangible area after breakage.

Preferably, the fastening component, where appropriate except the subplate, is made in one piece.

According to another aspect, another object of the invention is also a method for manufacturing a composite material part, comprising the steps of:
- inserting the insertion tip of a fastening component having the aforementioned characteristics through a composite material sheet,
- generating a force on the insertion tip so as to cause breakage of the frangible portion.

This method allows obtaining a composite material part having a fastening component rapidly and at lower costs. This enables the assembly or the easy dismount of this composite material part to other parts of a vehicle for example or of any other structures that may integrate composite material parts.

The step of inserting the insertion tip through the composite material sheet may be achieved by closure of a mold where the composite material sheet and the fastening component are positioned.

The step of generating a force on the insertion tip to cause breakage of the frangible portion may be achieved by closure of this mold. Thus, the steps of inserting the fastening component and/or of separating the insertion tip after breakage of the frangible portion may be achieved by closure of the mold.

According to a preferred embodiment, the method comprises the generation of ultrasounds on the fastening component during the insertion of the insertion tip through the composite material sheet.

The generation of ultrasounds facilitates the insertion of the insertion tip through the composite sheet, as well as the spreading of the fibers of the composite sheet during this insertion.

The insertion of the insertion tip and the generation of ultrasounds are concomitant. These steps may be achieved via a robotized feeding arm intended to bring the fastening component opposite the composite sheet, this arm may be equipped with an ultrasounds actuator. Nonetheless, according to a preferred embodiment, the ultrasounds actuator is provided on the mold. Its presence facilitates the insertion of the insertion tip into the composite sheet during the closure of the mold.

The method may comprise a subsequent plastic matter injection step.

The method may comprise a surface treatment step for preventing the corrosion of the fastening component, in particular at the level of the breakage area.

BRIEF DESCRIPTION OF THE DRAWINGS

Other features and advantages of the present invention will clearly come out from the detailed description hereinafter of one embodiment, given as a non-limiting example, with reference to the appended drawings in which.

DETAILED DESCRIPTION

Figure 1:
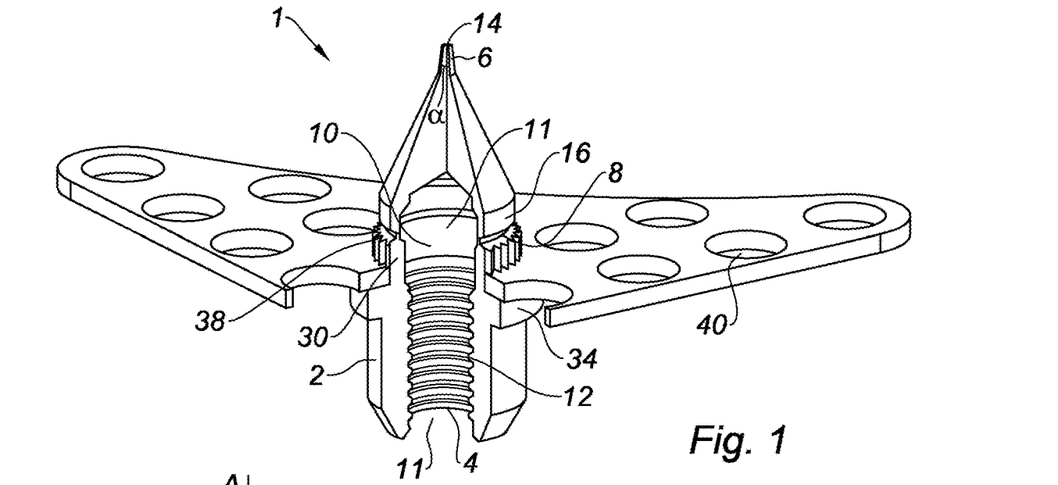
FIG. 1 is a perspective and partial sectional view of a fastening component according to an embodiment of the invention.
Figure 4:
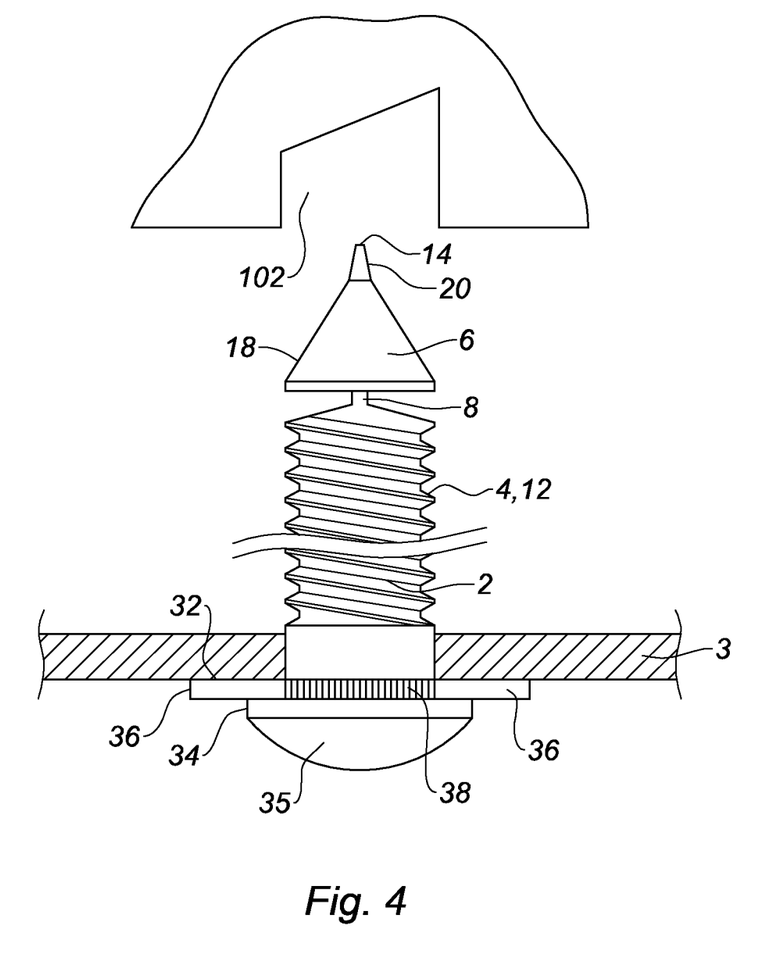
FIG. 4 is a side view of a fastening component according to an embodiment of the invention.

FIGS. 1 and 4 show a fastening component 1 according to an embodiment of the invention, respectively of the female type and of the male type.

The fastening component 1 comprises a body 2, which may be cylindrical shaped, fastening member, for example a thread 4, formed on the body 2 and intended for fastening to a complementary component such as a screw or a nut, an insertion tip 6 arranged at one end of the body 2, an axial stop 32, and a frangible portion 8 interposed between the insertion tip 6 and the end of the body 2, the frangible portion 8 being intended to break up by the action of a predetermined force, in particular axial, exerted on the insertion tip 6 in order to detach the insertion tip 6 from the body 2 and thus clear access to the fastening member.

The fastening member extends only beneath the frangible portion 8, and therefore beneath the insertion tip 6, between the end of the body 2 to which the insertion tip 6 is linked by the frangible portion 8 and an opposite end of the body 2.

For a female-type fastening component 1, as shown in FIG. 1, the body 2 may delimit a conduit 10, in particular cylindrical, having a lateral wall 12 on which the fastening member, such as the thread 4, are formed. The central conduit 10 delimits one or two opening(s) 11 at one or two end(s) of the body 2. Thus, the central conduit 10 may be intended to form a blind or through hole. Thus, the body 2 is intended to receive a complementary fastening component such as a screw.

According to the example of FIG. 4, the body 2 has an outer lateral wall 12, where the fastening member, such as the thread 4, is formed. Hence, the fastening component 1 according to FIG. 4 consists of a pin intended to be inserted into a complementary fastening component so as to assemble two parts, for example.

Instead of the thread 4, the fastening member may include a smooth index axis or a lug or a groove enabling a quarter-turn type assembly, for example.

The insertion tip 6 is shaped so as to allow inserting at least one portion of the body 2 through a composite material sheet 3 based on woven or loose fibers. The insertion tip 6 comprises a tip-shaped apex 14 and, opposite to the apex 14, a base 16 which hides the end of the body 2 to which the insertion tip 6 is attached when the fastening component 1 is looked at according to an axial direction A at the insertion tip 6 side. In other words, the base 16 extends over the corresponding end of the body 2 and overlaps it. The width or diameter, more generally the section of the base 16, is equal to or larger than, preferably larger than, the width, diameter or section of the corresponding end of the body 2, and in particular the portion of the body 2 extending from this end up to the axial stop 32.

Advantageously, the insertion tip 6 allows inserting the body 2 through a composite material sheet without altering the mechanical performances of the latter. Hence, the insertion tip 6 is configured to move away and divert the fibers of the composite material rather than sectioning them.

Thus, the insertion tip 6 comprises a base portion 18 extending from the frangible portion 8, in particular from the base 16, and an end portion 20 extending in particular up to the apex 14. The base portion 18 has an apex angle which is larger than the apex angle α of the end portion 20.

Thus, the end portion 20, more slender, pierces the composite material while sectioning as fewer fibers as possible, and then the base portion 18, moves away the fibers, diverts them and clears a passage for the body 2 by rearranging the fibers all around the latter.

The base portion 18 may be truncated-cone shaped. The end portion 20 may be conical. Alternatively, the base portion 18 and the end portion 20 may have a concave lateral wall so that the insertion tip 6 gets more and more slender in the direction of the apex 14. In both cases, as previously indicated, the insertion tip 6 has an apex angle which decreases progressively in the direction of the apex 14.

The insertion tip 6 becoming a disposable part after its detachment from the body 2, the height of the insertion tip 6 is reduced to minimum so as to limit the matter cost, yet without decreasing the performances of penetration and diversion without breakage of the fibers of the composite matrix. Thus, the height h of the end portion 20 may be smaller than the height H of the base portion 18.

Preferably, as shown in the figures, the insertion tip 6, in particular the base and end portions 18, 20, are cone shaped, which enables an even distribution of bearing on the frangible portion 8 during the introduction of the insertion tip 6, as well as of the fibers around the body 2.

According to the example of FIG. 1, for a female-type fastening component 1, the insertion tip 6 may advantageously comprise a bearing surface 22 which extends all around the conduit 10, opposite a receiving surface 24 of the body 2, and which is intended to bear against the receiving surface 24 after breakage of the frangible portion 8. The receiving surface 24 extends all around the opening 11 located at the insertion tip side, such that bearing of the bearing surface 22 on the receiving surface 24 allows closing access to the opening 11, to the central conduit 10, and therefore avoiding the introduction of plastic matter inside the central conduit 10 during a subsequent injection step.

The frangible portion 8 connects the body 2 to the insertion tip 6, is secured both to the body 2 and to the insertion tip 6. The frangible portion 8 herein forms a matter bridge between the body 2 and the insertion tip 6.

The frangible portion 8 is intended to break up by the action of a predetermined force exerted on the insertion tip, in particular according to the axis A of the body 2, preferably higher than a force for inserting the insertion tip 6 through a composite material sheet 3. To this end, the frangible portion 8 may consist of a portion with a smaller thickness than the thickness of the body 2 and of the insertion tip 6.

It should be noted that in order to enable the breakage of the frangible portion 8, without buckling of the body 2, the width, thickness or, where appropriate, the diameter of the frangible portion 8 is substantially smaller than the width, thickness or diameter of the adjacent body 2 and insertion tip 6, for example smaller than half, third, preferably quarter, and more advantageously smaller than fifth of the width, thickness or diameter of the adjacent body 2 and insertion tip 6.

According to the example of FIG. 1, the frangible portion 8 is a wall, in particular in the form of a cylindrical ring, thinned in comparison with the portions of the body 2 and of the insertion tip 6 to which this frangible portion 8 is secured.

According to the example of FIG. 4, the frangible portion 8 is a stud having one end secured to the insertion tip 6 and an opposite end secured to an end of the body 2. The diameter of this stud is substantially smaller than that of the body 2 and of the insertion tip 6.

Figure 2:
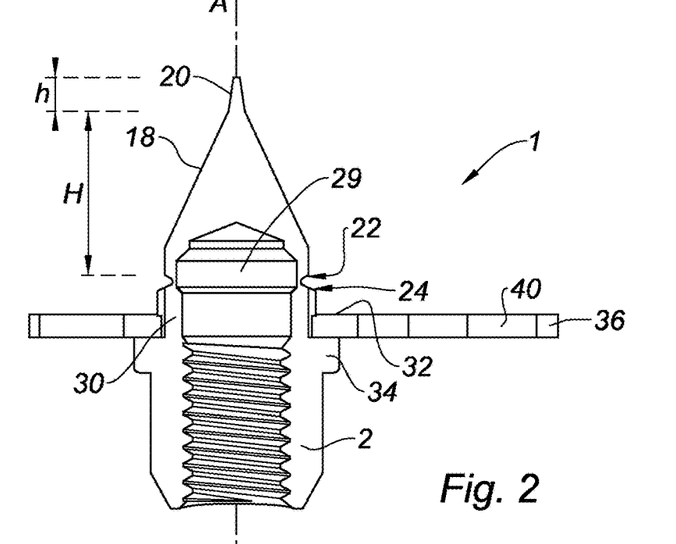
FIGS. 2 and 3 are longitudinal sectional views of a fastening component according to an embodiment of the invention, respectively before and after breakage of the frangible portion.
Figure 3:
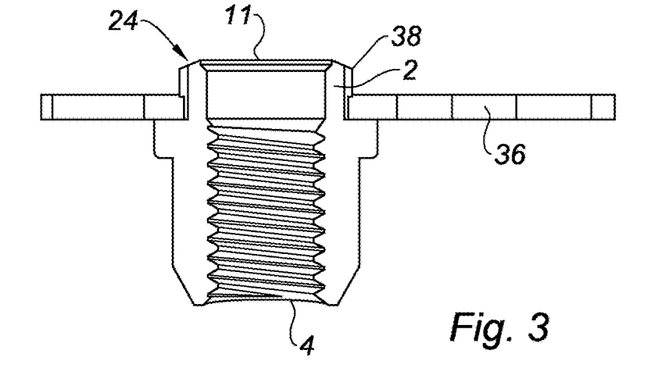

Preferably, as shown in FIG. 2 where the fastening component 1 is a female-type one, the insertion tip 6 may have a conduit 29 with a width or diameter larger than that of the conduit 10.

Moreover, the frangible portion 8 may have a thickness which decreases in the direction of the body 2. This enables the breakage to occur the closest to the body 2, and therefore most of the frangible portion 8 remains secured to the insertion tip 6 which will be detached from the body 2. Thus, there is no need necessarily for a step of finish machining after breakage of the frangible portion 8. For example, the stud of FIG. 4 may have a truncated-cone shape, with its apex at the body 2 side, that is to say having a smaller diameter at the body 2 side than at the insertion tip 6 side. Thus, the stud will be detached in priority from the body 2 so as to remain in cohesion with the insertion tip 6.

In order to compensate for the compression of the body 2 resulting from bearing of the insertion tip 6 against the body 2 after breakage of the frangible portion 8, the body 2 may comprise a compaction portion 30 intended to be compacted by the action of this compression.

The compaction portion 30 is arranged between the frangible portion 8 and the fastening member such as the thread 4, so as to protect the fastening member. In other words, the compaction portion 30 is intended to be deformed instead of the fastening member.

According to the example of FIGS. 1 and 2, the compaction portion 30 delimits a central conduit 10 section larger than the portion of the body 2 supporting the fastening member. Thus, the compaction portion 30 can be compacted so as to absorb the bearing of the insertion tip 6, without hindering access to the functional portion of the central conduit 10 where the fastening member extends. In particular, the compaction portion 30 may have a thickness smaller than that of the rest of the body 2. Advantageously, the receiving surface 24 is formed on the compaction portion 30.

According to the example of FIG. 4, the stud itself is compacted so as to absorb the bearing of the insertion tip 6. Nonetheless, the end of the body 2 may comprise a compaction portion 30 which has a substantially conical shape at the frangible portion 8 side, that is to say at the stud side. This compaction portion 30 is squashed by the insertion tip 6 after breakage, so as to avoid a deformation, for example a compaction or buckling, of the rest of the body 2 and in particular of the fastening member. It should be noted that the end portion 20 is also intended to be compacted so as to keep from compaction or buckling the portion of the body 2 where the fastening member is located.

Preferably, for a male-type fastening component 1, the end of the body 2 to which the insertion tip 6 is connected via the frangible portion 8 may have a width or external diameter which decreases in the direction of the frangible portion 8 so as to serve as a guide for the setup, for example, of a complementary nut after detachment of the insertion tip 6. For example, this end of the body 2 may be conical.

The axial stop 32 extends radially from the body 2. The axial stop 32 is intended to bear, directly or indirectly, against the composite material sheet 3 so as to stop the insertion of the body 2 through this composite material sheet 3.

The axial stop 32 may be integral with the body 2, the body 2 and the stop 32 forming one piece, such that the fastening component 1 is integral, or still attached to the body 2 and secured to the latter for example by bonding, crimping, welding, etc.

In the first case, the axial stop 32 is formed for example by a collar or shoulder 34 extending from a lateral wall of the body 2 (FIGS. 1 and 2), or from a head 35 of the fastening component (FIG. 4).

In the second case, the axial stop 32 may be formed by a subplate 36 attached against the body 2. Where appropriate, the subplate 36 may be positioned so as to bear against the shoulder 34. The subplate 36 extends around the body 2, for example radially, and allows distributing bearing of the fastening component 1 on the composite material sheet 3. The subplate 36 may be assembled by crimping to the body 2, forcibly fitted, or welded to the body 2.

It should be noted that the fastening component 1 may include rotational blocking member configured to prevent a rotation of the fastening component 1 about the axis A of the body 2 once the fastening component 1 is set in place through the composite material sheet 3. The rotational blocking member may be formed on an external lateral wall of the body 2, the shoulder 34 or the subplate 36. For example, the rotational blocking member comprises corrugations 38 formed on the shoulder 34 or an external lateral wall of the body 2, where appropriate at the level of the subplate 36, and/or housings or holes 40 formed through the subplate 36 and in which the plastic matter is intended to flow in during an injection step. The rotational blocking member extends exclusively beneath the frangible portion 8, between the end of the body 2 connected to the insertion tip 6 and an opposite end of the body 2, in order not to peel off during the detachment of the insertion tip 6.

The fastening component 1 may be made of steel, stainless steel, titanium, a plastic material, whether charged or not, etc. Preferably, the fastening component 1 is made of aluminum. Preferably, the subplate 36 may be made of aluminum or steel.

The fastening component 1 may undergo a surface treatment in order to avoid the development of corrosion.

As shown in the figures, the fastening component 1, in particular the body 2, the insertion tip 6 and the frangible portion 8, is made into one piece, before detachment of the insertion tip 6, except the subplate 36 which is attached and enables an improved adaptability.

Another object of the invention is also a method for manufacturing a composite material part 100, comprising the steps of:
inserting the insertion tip 6 of the fastening component 1 having all or part of the previously-described characteristics through the composite sheet 3,
generating a force on the insertion tip 6 so as to cause breakage of the frangible portion 8.

The composite material sheet 3 may be obtained by cutting in a composite material a sheet with predetermined contour and dimensions. The composite material may comprise woven fibers or a mat.

It is possible to provide for a temperature setting, that is to say heat-up, step of an injection press and of a mold intended for shaping of the composite sheet 3, as well as of the composite sheet 3, placed for example in an oven.

Afterwards, the composite sheet 3 may be positioned inside the mold, for example by means of a robotized arm, and preferably pressed against one of the two portions of the mold, for example via pressing fingers, so as to adopt the shape of the cavity of the mold. This step of screening the composite sheet allows pre-positioning the latter into the cavity of the mold, immobilizing it according to its future end shape, which is particularly advantageous for relief shapes, in order to avoid a deterioration, tearing, etc. of the composite sheet or a deformation of the fastening components at the time of insertion of the fastening components through the composite material sheet.

Afterwards, the method comprises the setup of the fastening component(s) in the portion of the mold opposite to that receiving the composite sheet, for example in housings (not represented) provided to this end.

Afterwards, the method comprises a step of closing the mold, which causes the shaping of the composite sheet 3.

Figure 5A:
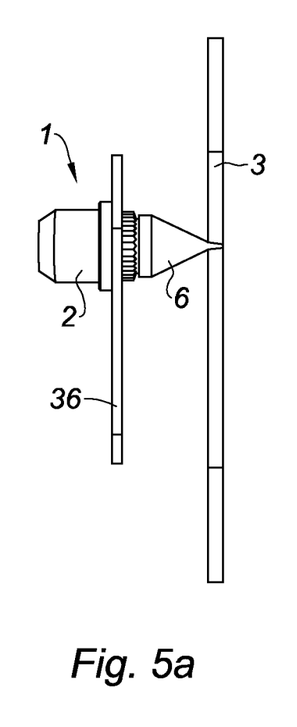
FIGS. 5a to 5e are side views illustrating steps of a method for manufacturing a composite material part and a fastening component according to an embodiment of the invention.
Figure 5B:
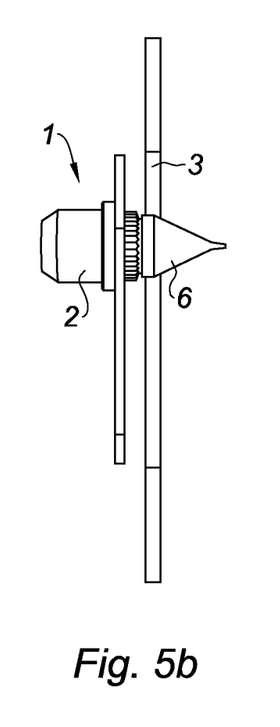

Furthermore, the closure of the mold causes, as a first step, a perforation of the composite sheet 3 by means of the apex 14 of the insertion tip 6 (FIG. 5a), and more particularly the end portion 20, then as a second step, a spreading of the fibers of the composite sheet 3. As it penetrates into the composite sheet, the insertion tip 6 progresses between the fibers by diverting them, yet without sectioning them (FIG. 5b).

Advantageously, the method may comprise a step of generating ultrasounds on the fastening component 1 during the insertion of the insertion tip, in order to facilitate the insertion of the insertion tip 6 by heat-up of the composite sheet 3.

Figure 5C:
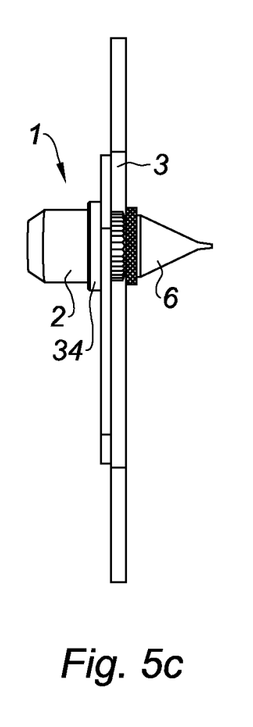

The step of inserting the insertion tip 6 through the composite sheet 3 ceases when the axial stop 32, for example the shoulder 34, or where appropriate the subplate 36, bears against the composite sheet 3 (FIG. 5c). At this level, the apex of the insertion tip 6 may have come into contact with the bottom of a housing 102 of the mold (FIG. 4) intended to receive it. As previously mentioned, continuing closing the mold generates a force, in particular axial, and therefore the compression of the insertion tip 6, for example by a few tenths of a millimeter, which causes breakage of the frangible portion 8.

In order to promote breakage of the frangible portion 8, the bottom of the housing 102 may be shaped so as to cause a tilt-up of the insertion tip 6. Thus, this bottom may be shaped, for example, as an inclined, or cambered, plane.

According to one embodiment, breakage of the frangible portion 8 may be caused by a radial force, for example a radial compression, or a force at least partially radial, combined for example with an axial force.

At this level, the insertion tip 6 is detached from the body 2. Nonetheless, the insertion tip 6 advantageously remains bearing against the body 2, for example via the bearing surface 22 pressed against the receiving surface 24, in order prevent the plastic matter from being introduced into the conduit 10 during a subsequent injection step.

Figure 5D:
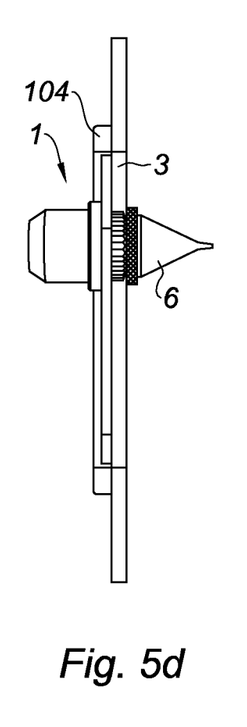

Indeed, the method may comprise an additional step of injecting a plastic matter (FIG. 5d), in particular at the level of the fastening component(s) 1, by overlapping the shoulder 34 and/or the subplate 36. The plastic matter coating 104 allows ensuring the cohesion of this or these fastening component(s) 1 with the composite sheet 3 (resistance to peeling off and resistance to the torque that will be applied afterwards to the fastening component cooperating with a complementary fastening component).

Figure 5E:
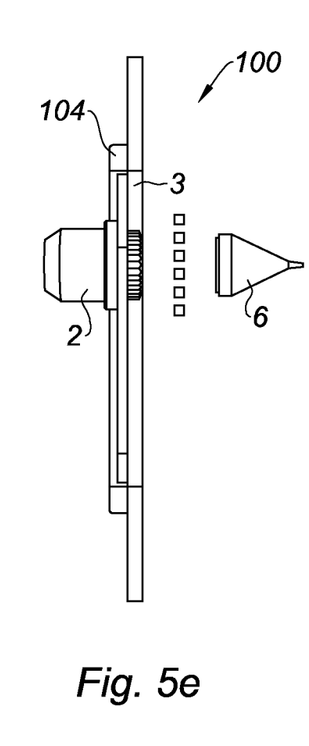

When opening the mold, the insertion tip 6 is detached from the fastening component 1 (FIG. 5e) and thus clears access to the body 2, in particular to the fastening member such as the thread 4, thereby allowing connecting the composite part 100 to one or several other part(s).

According to one embodiment, the method may comprises a step of expelling the insertion tip 6 before opening of the mold, for example by suction, by gravity, or mechanically, for example by pushing. This push may be exerted on the insertion tip 6 already detached via an insertion tip 6 of a successive fastening component 1.

Where necessary, it is possible to provide for a surface treatment step for the sectioned portion of the fastening component 1 in order to avoid the apparition of corrosion on this portion.

Figure 6:
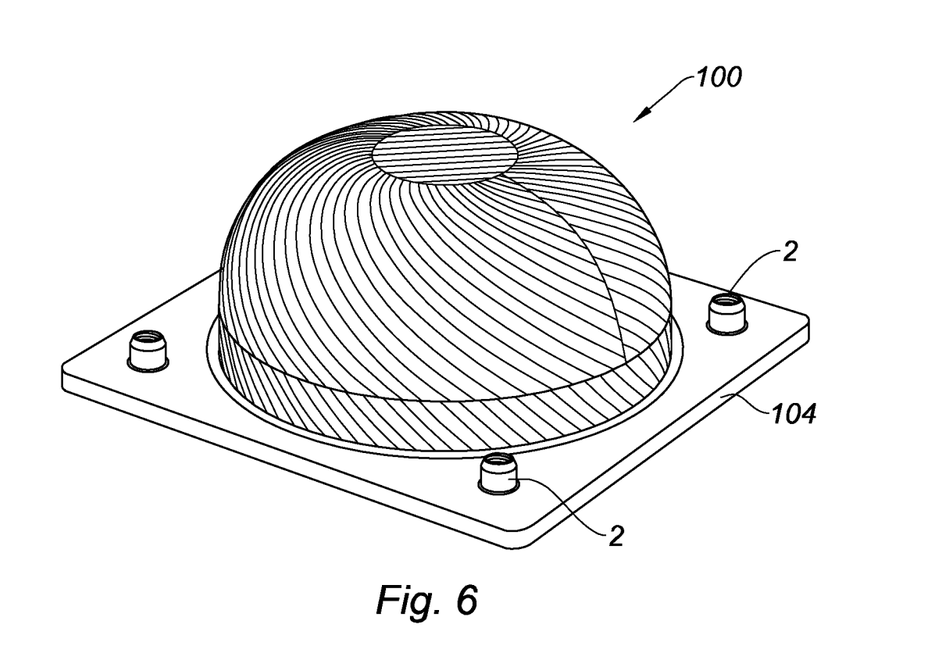
FIGS. 6 and 7 are respectively top and bottom perspective views of a composite material part obtained on completion of a manufacturing method according to an embodiment of the invention.
Figure 7:
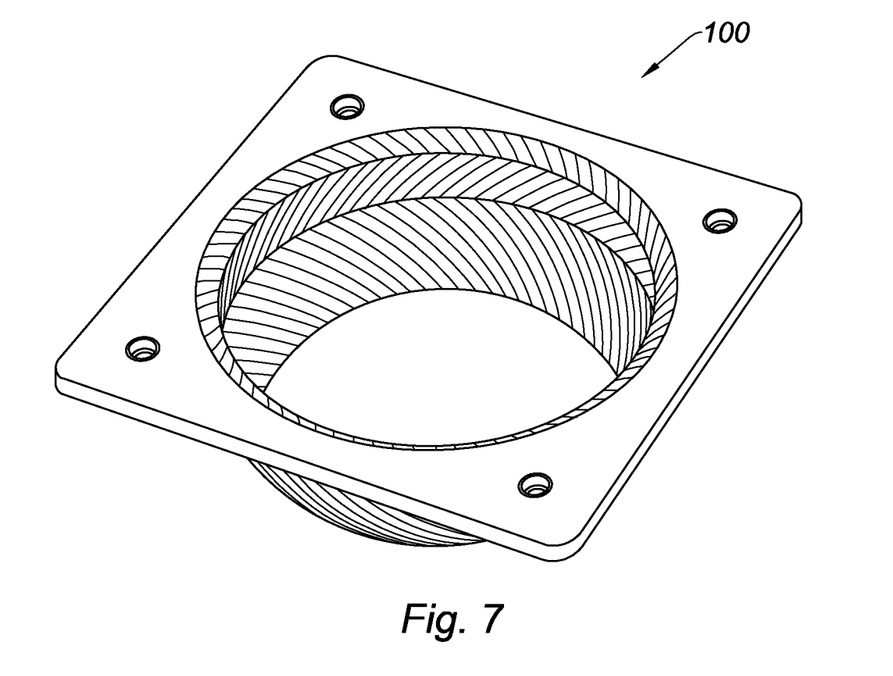

FIGS. 6 and 7 illustrate an example of a composite part 100 obtained on completion of this method.

Alternatively, instead of providing for an insertion of the fastening components 1 by closure of the mold, this insertion may take place by generation of a pressure exerted by a feeding robot. In addition, this feeding robot may be equipped with an ultrasounds generator in order to generate ultrasounds on the fastening component 1 in the direction of the composite sheet and thus facilitate the insertion of the fastening component(s) 1 into the composite sheet 3.

Alternatively, the setup of the composite sheet 3 inside the mold may be achieved by spraying short fibers within the cavity of the mold, and the insertion tip 6 of the fastening component(s) 1 may, after penetration through the short fibers mat, penetrate into retractable cavities of the mold (not represented) which progressively give way under a resistance lower than that necessary for breaking the frangible portion 8 until abutting and this time make the frangible portion 8 yield in order to separate the insertion tip 6.

Instead of providing for a breakage of the frangible portion 8 by closure of the mold, it is possible to provide for a breakage of the frangible portion 8 at the time of insertion of the insertion tip 6 into the composite sheet 3, or by generating a manual force on the insertion tip 6, directly or via a hand tool such as a clamp.

Besides, it may be provided, where appropriate, that the injection step takes place before breakage of the frangible portion 8, that is to say before generating on the insertion portion 6 a force likely to break the frangible portion 8.

Of course, the invention is by no way limited to the above-described embodiment, this embodiment having been given only but as example. Modifications are still possible, in particular with regards to the constitution of the various devices or by substitution with technical equivalents, yet without departing from the scope of the invention.

The invention claimed is:

1. A fastening component, comprising:
   a body comprising an inner thread configured for assembly of the fastening component to a piece integrating a complementary outer thread, and an axial stop configured to stop insertion of the body through a composite material part;
   an insertion tip arranged at an end of the body, the insertion tip being configured to be inserted through the composite material part, the insertion tip comprising a closed and pointed tip-shaped apex configured to pierce the composite material part;
   a frangible portion linking the insertion tip to the end of the body, the frangible portion being configured to break in order to detach the insertion tip from the end of the body; and
   wherein the inner thread of the body does not extend over the frangible portion and the insertion tip, the insertion tip being devoid of any thread.

2. The fastening component according to claim 1, wherein the insertion tip comprises a base portion and an end portion, the end portion having an apex angle smaller than an apex angle of the base portion, the apex angles of the end portion and the base portion being considered with regard to a longitudinal axis of the fastening component.

3. The fastening component according to claim 2, further comprising a conduit extending axially through the body.

4. The fastening component according to claim 2, wherein the body comprises a compaction portion arranged between the frangible portion and the inner thread.

5. The fastening component according to claim 4, further comprising a conduit extending axially through the body.

6. The fastening component according to claim 5, wherein the axial stop comprises an attached subplate.

7. The fastening component according to claim 1, wherein the insertion tip is cone shaped.

8. The fastening component according to claim 7, wherein the body comprises a compaction portion arranged between the frangible portion and the inner thread.

9. The fastening component according to claim 1, wherein the body comprises a compaction portion arranged between the frangible portion and the inner thread.

10. The fastening component according to claim 1, further comprising a conduit extending axially through the body.

11. The fastening component according to claim 1, wherein the axial stop comprises an attached subplate.

12. The fastening component according to claim 1, wherein the frangible portion has a thickness which decreases in a direction of the body.

13. The fastening component according to claim 1, wherein the fastening component is made of aluminum.

14. The fastening component according to claim 1, wherein the insertion tip has an apex.

15. The fastening component according to claim 1, wherein the fastening component includes rotational blocking member configured to prevent a rotation of the fastening component when the fastening component penetrates the composite material part.

16. The fastening component according to claim 1, wherein the insertion tip includes a base having a diameter equal to or greater than an outer diameter of the inner thread.

* * * * *